(12) United States Patent
Suzuki et al.

(10) Patent No.: US 6,614,389 B2
(45) Date of Patent: Sep. 2, 2003

(54) VEHICLE-ONBOARD SIGNAL PROCESSING DEVICE AND VEHICLE-ONBOARD RADAR SYSTEM

(75) Inventors: Mitsushige Suzuki, Hitachinaka (JP); Kazuaki Takano, Mito (JP); Ryuji Fukute, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/106,058

(22) Filed: Mar. 27, 2002

(65) Prior Publication Data

US 2003/0095062 A1 May 22, 2003

(30) Foreign Application Priority Data

Nov. 19, 2001 (JP) ........................... 2001-353272

(51) Int. Cl.⁷ ............... G01S 13/00; B60T 7/16; B62D 1/24
(52) U.S. Cl. ............... 342/70; 342/194; 180/167
(58) Field of Search ............... 342/70, 175, 194, 342/196; 340/992; 180/167, 168, 169

(56) References Cited

U.S. PATENT DOCUMENTS

| | | | |
|---|---|---|---|
| 4,758,805 A | * | 7/1988 | Yamazaki et al. ............ 333/12 |
| 5,512,901 A | * | 4/1996 | Chen et al. ............ 342/175 |
| 5,614,909 A | * | 3/1997 | Komatsu et al. ............ 342/70 |
| 6,008,750 A | * | 12/1999 | Cottle et al. ............ 342/42 |
| 6,249,242 B1 | * | 6/2001 | Sekine et al. ............ 342/70 |
| 6,275,180 B1 | * | 8/2001 | Dean et al. ............ 342/70 |
| 6,366,235 B1 | * | 4/2002 | Mayer et al. ............ 342/70 |

FOREIGN PATENT DOCUMENTS

JP 7-66746 3/1995

* cited by examiner

Primary Examiner—Thomas H. Tarcza
Assistant Examiner—Brian Andrea
(74) Attorney, Agent, or Firm—Crowell & Moring LLP

(57) ABSTRACT

In order to magnetically shield the transmission line which connects the external connector mounted on the outer housing with the internal circuit and also to make it possible to freely mount the external connector without being limited by the position of the internal circuit, an outer housing 60 consists of an outer housing main body 61 and a shielding layer 62 applied to the inner-periphery surface of the outer housing 60. An transmission line 73 extends from the internal circuit through the outer-periphery side of the shielding layer 62 of the outer housing 60 along the shielding layer 62 to the desired position, where the external connector 70 is placed.

23 Claims, 9 Drawing Sheets

VEHICLE-ONBOARD SIGNAL PROCESSING DEVICE AND VEHICLE-ONBOARD RADAR SYSTEM

BACKGROUND OF THE INVENTION

The present invention relates to a vehicle-onboard signal processing device, for example, a radar system, automobile navigation system, and the like, which is mounted on a vehicle in order to receive and transmit signals between the vehicle and the outside.

In a radio-wave type radar system that uses radio waves of millimeter wave band, the attenuation of radio beam is small even during the bad weather where rain or fog is present, so that the maximum detection distance required for a vehicle-onboard device can be ensured. For this reason, the radio-wave type radar system has been merchandised as a sensor for measuring the distance between the own car and a car ahead or measuring the relative velocity. Such a vehicle-onboard radar system is to be equipped with various magnetic shields to prevent electromagnetic noise from leaking to the outside and also from entering from the outside.

For example, in a device disclosed in Japanese application patent laid-open publication No. Hei 7-66746, a cylindrical shaft made of conductive material is disposed between the inside surface of an outer housing and an internal circuit, and signal lines and the like are placed inside the cylindrical shaft so as to increase the cut-off frequency in the space between the internal circuit and the inside surface of the outer housing and also to block electromagnetic noise generated from the signal lines, and the like.

SUMMARY OF THE INVENTION

However, in the prior art, if the signal line connects the external connector placed on the outer housing to the internal circuit, because the signal line is covered with the cylindrical shaft made of conductive material, it is necessary to place the connector at a location on the outer housing that is closest to the internal circuit; as a result, a problem arises because of the limited placement of the connector. This kind of limitation is not preferable for a vehicle-onboard device which already has strict limitations on size and placement. For example, when a vehicle-onboard device is to be mounted in a concave portion of a vehicle, if an external connector is placed at a certain location on the vehicle-onboard device, a problem arises in that an external connection cable cannot be connected to the connector. Even if the external connection cable is connected, the cable may block and prevent the vehicle-onboard device from being mounted in the concave portion. Further, if a cylinder of the appropriate length is properly bent and used instead of the magnetic shielding cylindrical shaft, the connector can be freely placed at any location. However, in this case, a space to place the relatively long, bent cylinder is required in the outer housing, thereby increasing the size of the device.

Furthermore, the foregoing prior art has another problem with electromagnetic noise generated from the signal line leaking from the opening at the end portion of the internal circuit side of the cylindrical shaft, causing insufficient magnetic sealing.

Accordingly, in view of the foregoing problems of the prior art, a first objective of the present invention relating to this application is to provide a vehicle-onboard signal processing device which magnetically shields the transmission line that connects the external connection portion placed on the outer housing to the internal circuit and simultaneously makes it possible to mount the external connection portion at any location without increasing the size of the device.

Furthermore, a second objective of the present invention relating to this application is to provide a vehicle-onboard signal processing device which can perform sufficient magnetic shielding.

A vehicle-onboard signal processing device provided to achieve the first objective to achieve said objectives is mounted on a vehicle so as to receive and transmit a transmission target including a signal and electric power between the vehicle and the outside, and comprises an internal circuit where said transmission target is input and output, an outer housing which covers said internal circuit and a conductive shielding layer is applied to the inner-periphery side of said outer housing, an external connection portion mounted to said outer housing and facing the outside of said outer housing so as to transmit and receive said transmission target with said outside, and a transmission line which electrically connects said internal circuit to said external connection portion, wherein said transmission line extends from said external connection portion as a base point, goes between the outer-periphery surface of said outer housing and said shielding layer, extends along the spreading direction of the inner-periphery surface or the outer-periphery surface of the outer housing, penetrates the shielding layer, and then connects to said internal circuit.

Further, a vehicle-onboard signal processing device provided to achieve said second objective is mounted on a vehicle so as to receive and transmit a transmission target including a signal and electric power between the vehicle and the outside, and comprises an internal circuit board having an internal circuit where said transmission target is input and/or output, a board support base which supports said internal circuit board, an outer housing which covers said internal circuit board and said board support base and a conductive shielding layer is applied to the inner-periphery side of said outer housing, and a transmission line which penetrates said shielding layer from the outer-periphery side to the inner-periphery side and is electrically connected to said internal circuit so as to transmit and receive said transmission target with said outside, wherein said board support base has a cylindrical shielding portion made of conductive material which covers the outer periphery of the transmission line between the position at which said transmission line penetrates said shielding layer and said internal circuit board;

said internal circuit board comes in contact with said cylindrical shielding portion to close the opening at the end portion of said cylindrical shielding portion;

said internal circuit board has a conductive layer and a noise removal means for removing noise coming through said transmission line; and the noise removal means is placed immediately before or after the position at which said transmission line extending from said shielding layer penetrates said conductive layer.

DETAILED DESCRIPTION OF THE PREFERRED EMBODIMENT

Preferred embodiments of a vehicle-onboard signal processing device according to the present invention will be described below with reference to the drawings.

Figure 8:
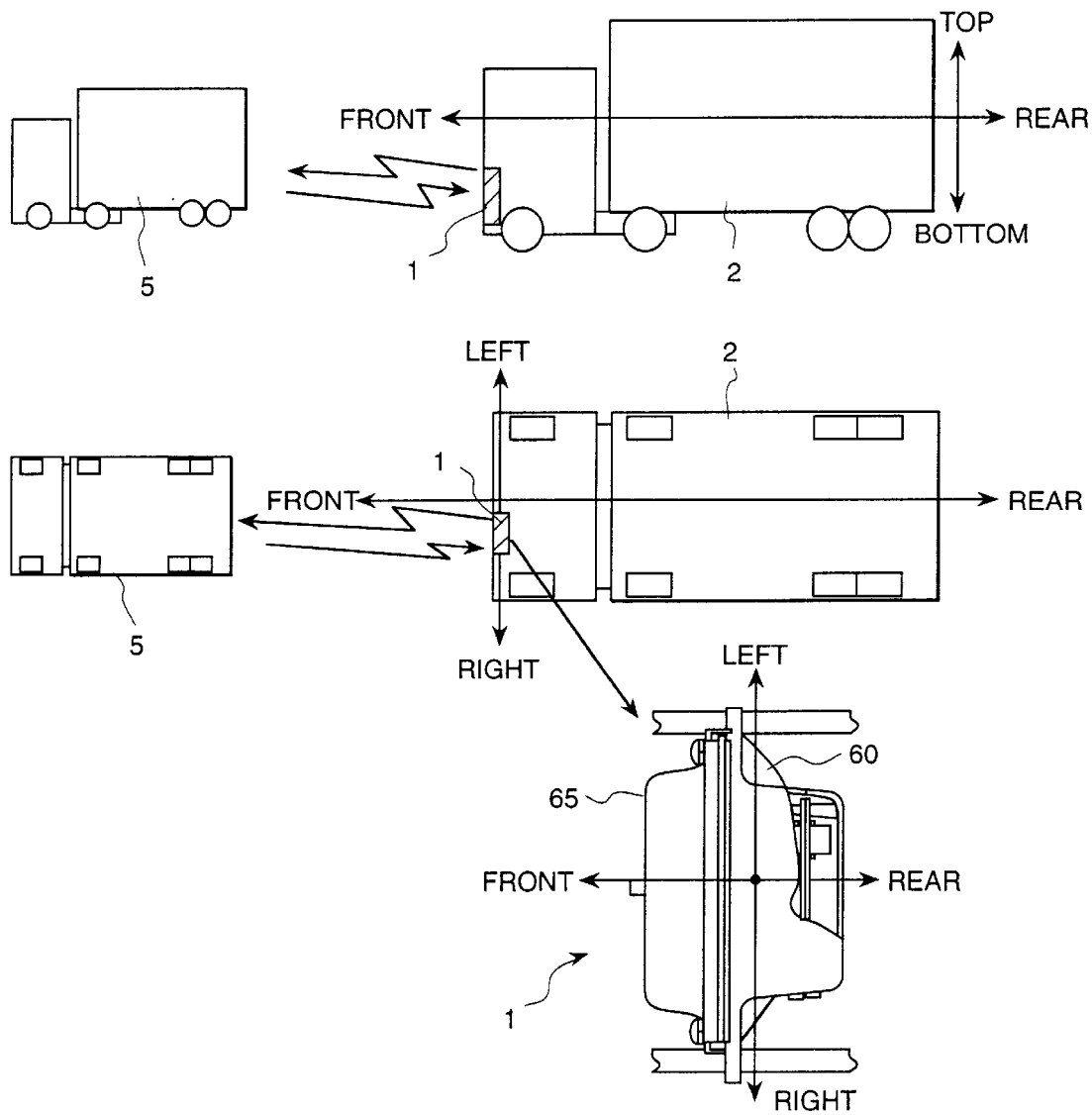
FIG. 8 is an explanatory drawing that shows a mounting position of a vehicle-onboard radar system which is an embodiment according to the present invention.

As shown in FIG. 8, a vehicle-onboard signal processing device of this embodiment is a vehicle-onboard radar system 1, which is mounted to the front end portion of an own vehicle 2 so as to measure the relative distance to an object 5 such as a preceding vehicle, relative velocity, directional angle, and the like.

Figure 1:
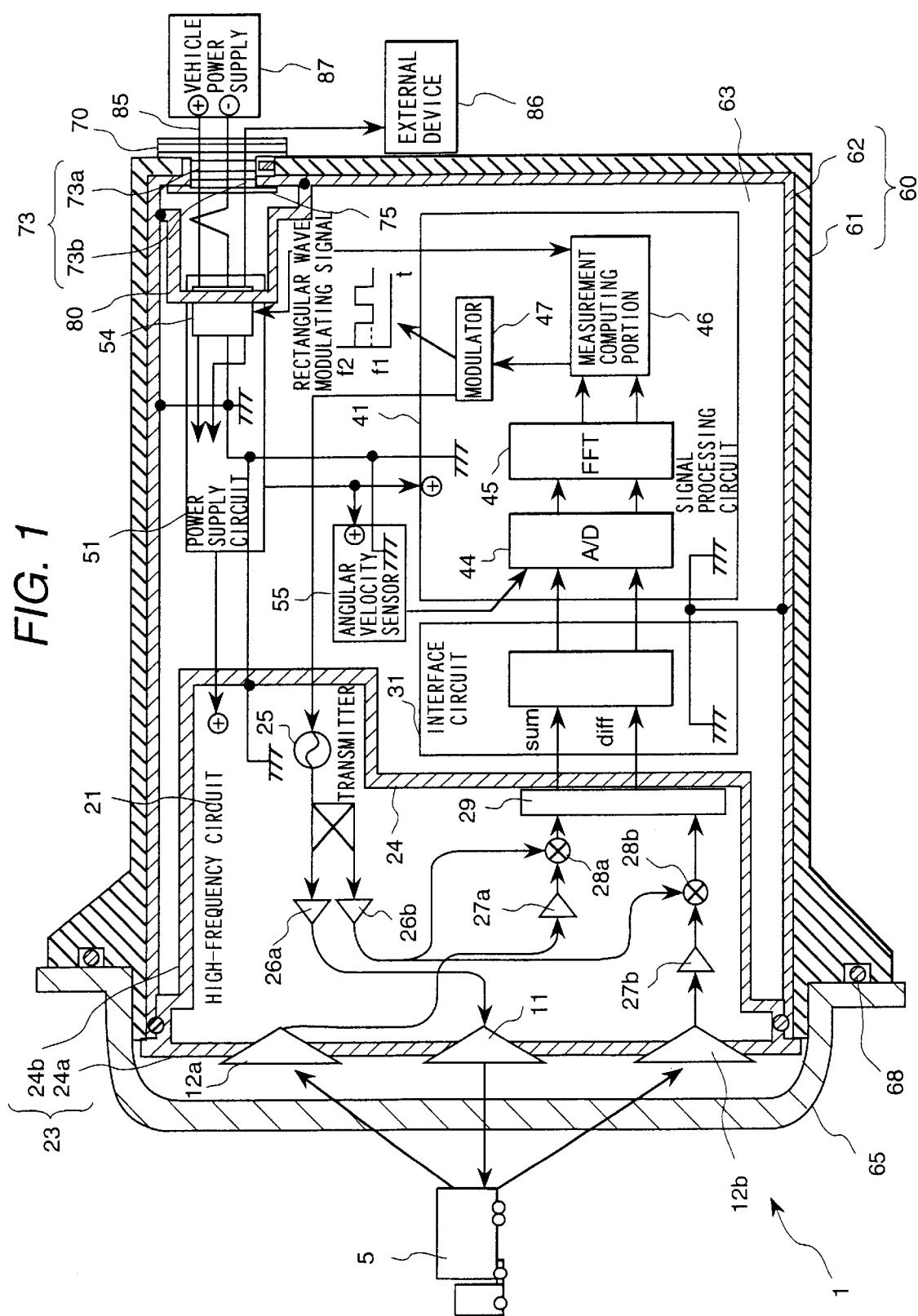
FIG. 1 is a circuit block diagram of a vehicle-onboard radar system which is an embodiment according to the present invention.

This vehicle-onboard radar system 1, as shown in FIG. 1, comprises a transmission antenna 11, two receiving antennas 12a and 12b, a radome 65 which covers the radiowave radiation side of respective antennas 11,12a, and 12b, a high-frequency circuit 21 which transmits transmission signals to the transmission antenna 11 and receives received signals from the receiving antennas 12a and 12b, a signal processing circuit 41 which executes various processing based on the received signals, an interface circuit 31 located between the high-frequency circuit 21 and the signal processing circuit 41, an angular velocity sensor 55, a filter circuit (noise removal means) 54 which removes noise from the transmission line, a power supply circuit 51 which supplies electric power to each circuit and the like, an outer housing 60 which covers each circuit and the like, and an external connector (external connection portion) 70.

The high-frequency circuit 21 comprises a transmitter 25 which outputs two kinds of transmission signals f1 and f2 at different times based on two kinds of modulating signals of different frequency f1 and f2 transmitted from the signal processing circuit 41, transmission side amplifiers 26a and 26b which amplify the transmission signals f1 and f2 and transmit them to the transmission antenna 11 and the like, receiving side amplifiers 27a and 27b which amplify received signals sent from the respective receiving antennas 12a and 12b, mixers 28a and 28b which mix the outputs from the respective receiving side amplifiers 27a and 27b with the output from the transmission side amplifier 26b, and a sum and difference signal generating circuit 29 which generates sum signals and difference signals from the signals sent from the respective mixers 28a and 28b.

The signal processing circuit 41 comprises an A/D converter 44 which converts sum signals (sum) and difference signals (diff) input from the high-frequency circuit 21 via the interface circuit 31 and angular velocity signals input from the angular velocity sensor 48 into digital signals from analog signals, an FFT circuit 45 which performs FFT (Fast Fourier Transform) processing for the digitally converted sum signals and difference signals and the like, a measurement computing portion 46 which obtains the distance to an object, relative velocity and directional angle based on the signals sent from the FFT circuit 45, and a modulator 47 which generates modulating signals f1 and f2 sent to the high-frequency circuit 21.

Herein, the principle of distance measurement and the like performed by a vehicle-onboard radar system of this embodiment will be briefly described.

Figure 9:
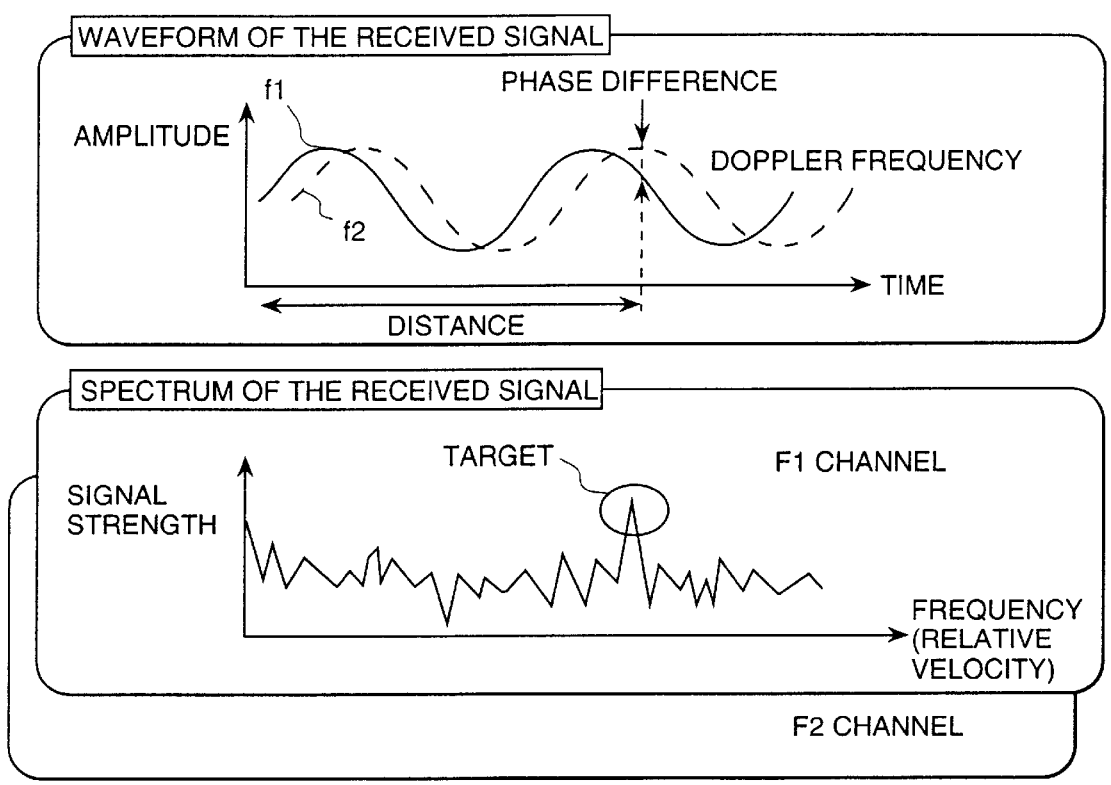
FIG. 9 is an explanatory drawing that shows the principle of distance measurement and velocity measurement performed by a vehicle-onboard radar system which is an embodiment according to the present invention.

The transmitter 25 transmits signals of two frequencies f1 and f2 to the transmission antenna 11 via the transmission side amplifier 26a by temporally switching the signals based on the modulating signals sent from the modulator 47. The transmission antenna 11 outputs two kinds of high-frequency radio wave signals which correspond to the two kinds of transmission signals f1 and f2 sent from the transmitter 25. Reflected waves from an object 5 located ahead of the own vehicle are received by receiving antennas 12a and 12b, and received signals from the receiving antennas 12a and 12b are input into the sum and difference signal generating circuit 29 via mixers 28a and 28b. This sum and difference signal generating circuit 29 obtains sum signals (sum) and difference signals (diff) from the two received signals and transmits the signals to the signal processing circuit 41 via the interface circuit 31. The sum signal (sum) and difference signal (diff) are converted to digital signals by the A/D converter 44 located in the signal processing circuit 41, and analyzed on the frequency axis by the FFT circuit 45, and then converted to the frequency spectrum shown in the lower stage in FIG. 9. The measurement computing portion 46, for example, obtains the relative velocity of an object (target) based on the frequency at a position where the signal strength is the maximum in the frequency spectrum of the sum signal. Further, in the frequency spectrum of the sum signal, peak signals which correspond to respective transmission frequencies are detected, as shown on the upper stage in FIG. 9, and the relative distance is obtained from the phase difference of the peak signals. Furthermore, the directional angle of the object is obtained from the ratio between the sum signal and the difference signal.

The relative distance and the like to an object which have been obtained by the measurement computing portion 46 are sent to an external device 86, such as a vehicle control device, alarm generating device, or the like, via a filter circuit 54, a signal line 73b which constitutes a transmission line 73, an external connector 70, and an external connection cable 85. Further, from those external devices 86, a motion start command and the own vehicle velocity are input into the measurement computing portion 46 via an external connection cable 85, an external connector 70, a signal line 73b which constitutes a transmission line 73, and the filter circuit 54. Furthermore, electric power from the vehicle power supply 87 is input into the power supply circuit 51 via an external connection cable 85, an external connector 70, a signal line 73a which constitutes a transmission line 73, and the filter circuit 54.

Figure 2:
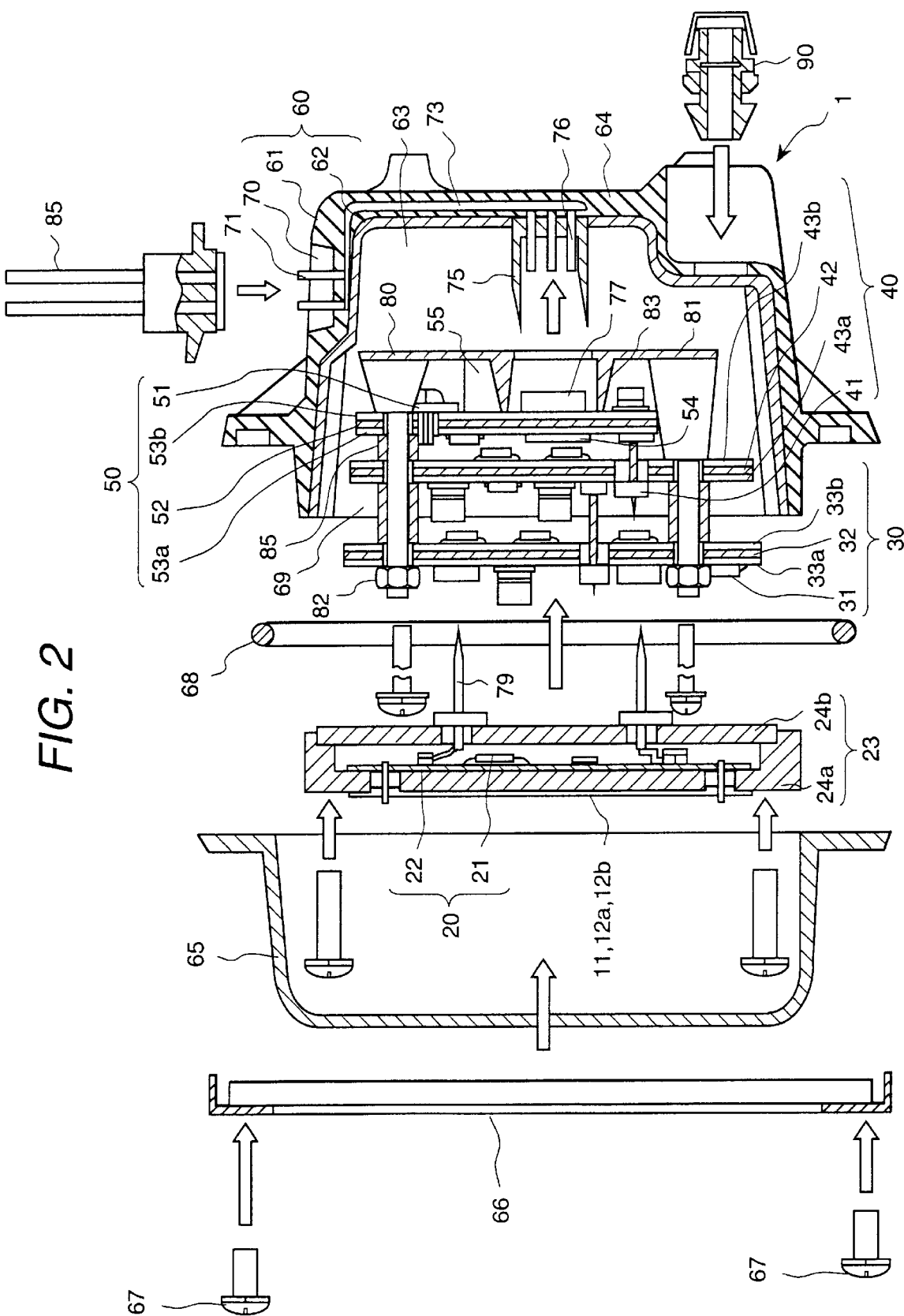
FIG. 2 is an exploded cross-sectional view of a vehicle-onboard radar system which is an embodiment according to the present invention.
Figure 3:
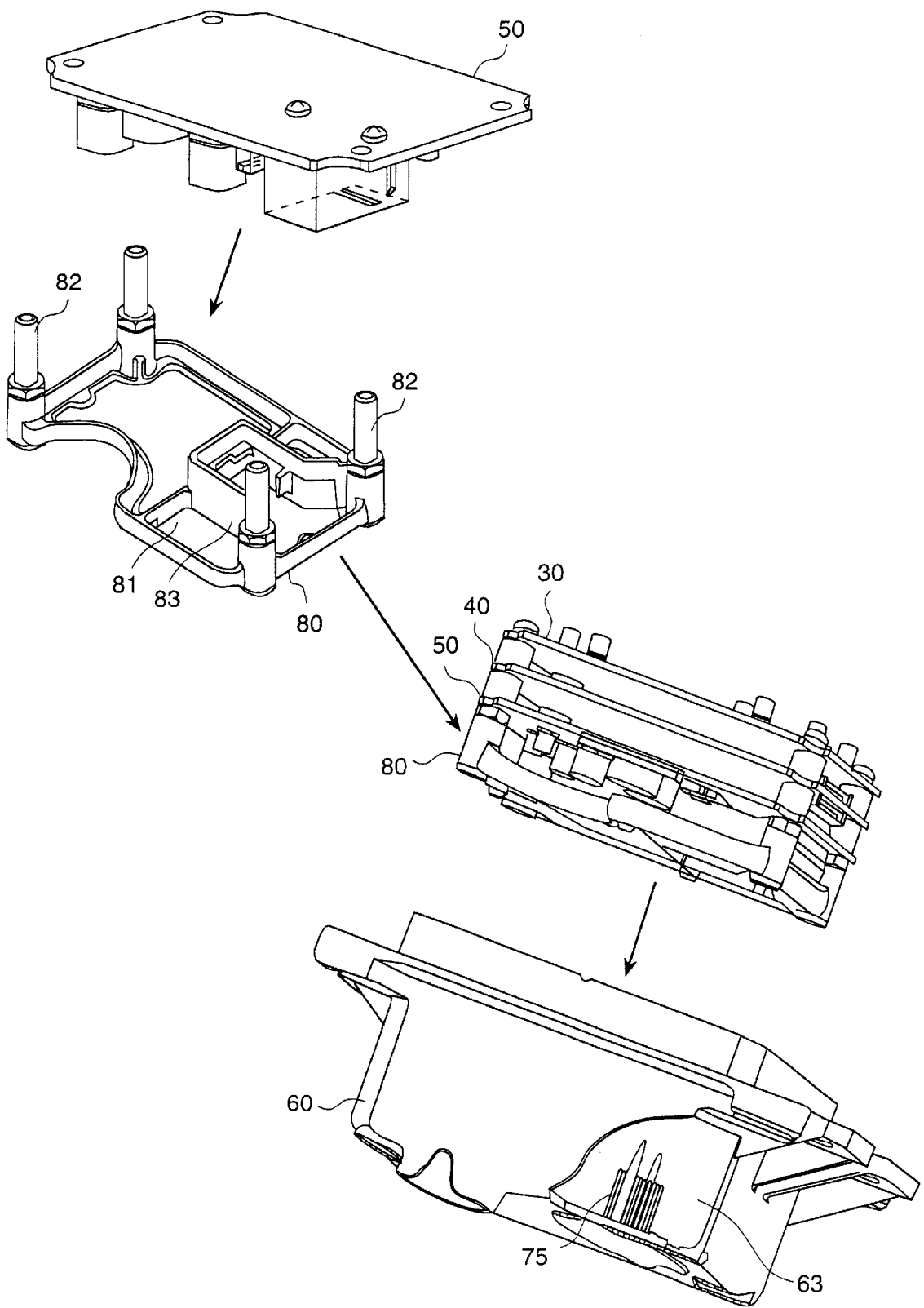
FIG. 3 is an exploded perspective view of a vehicle-onboard radar system which is an embodiment according to the present invention.

As shown in FIGS. 2 and 3, an outer housing 60 is almost rectangular parallelepiped, and one surface equivalent portion is an opening 69 and concaved to the opposite surface, and the concaved space functions as a storage chamber 63. This outer housing 60 comprises an outer housing main body 61 made of insulating resin, and a conductive shielding layer 62 which is applied to the entire inner-periphery surface of the outer housing. An external connector 70 is provided on the outer-periphery surface of the outer-periphery wall of the outer housing 60, and an internal circuit connector 75 is provided on the inner-periphery surface of the bottom wall 64 of the outer housing 60, and a breathing valve air intake 90 is disposed to the bottom wall 64 of the outer housing 60. A connector pin 71 of the external connector 70 and a connector pin 76 of the internal circuit connector 75 are connected by a transmission line 73. The transmission line 73 extends from the connector pin 71 of the external connector 70, is routed through the outer-periphery wall of the outer housing main body 61 and further through the bottom wall 64 of the outer housing main body 61 and then connected to the connector pin 76 of the internal circuit connector 75. Herein, the outer housing main body 61 is made of insulating resin mainly because of ensuring insulation between the transmission line 73 and the shielding layer 62. Therefore, when the transmission line 73 is covered with insulating coating, the outer housing main body 61 can be made of conductor material. Accordingly, it is possible that the entire outer housing 60 may consist of conductive metal and the coated transmission line 73 can pass through the outer housing. Further, it is also possible to mount the transmission line 73 along the outer-periphery surface or the inner-periphery surface of the outer housing main body 61. Namely, the transmission line 73 can be mounted along a convenient route.

Figure 7:
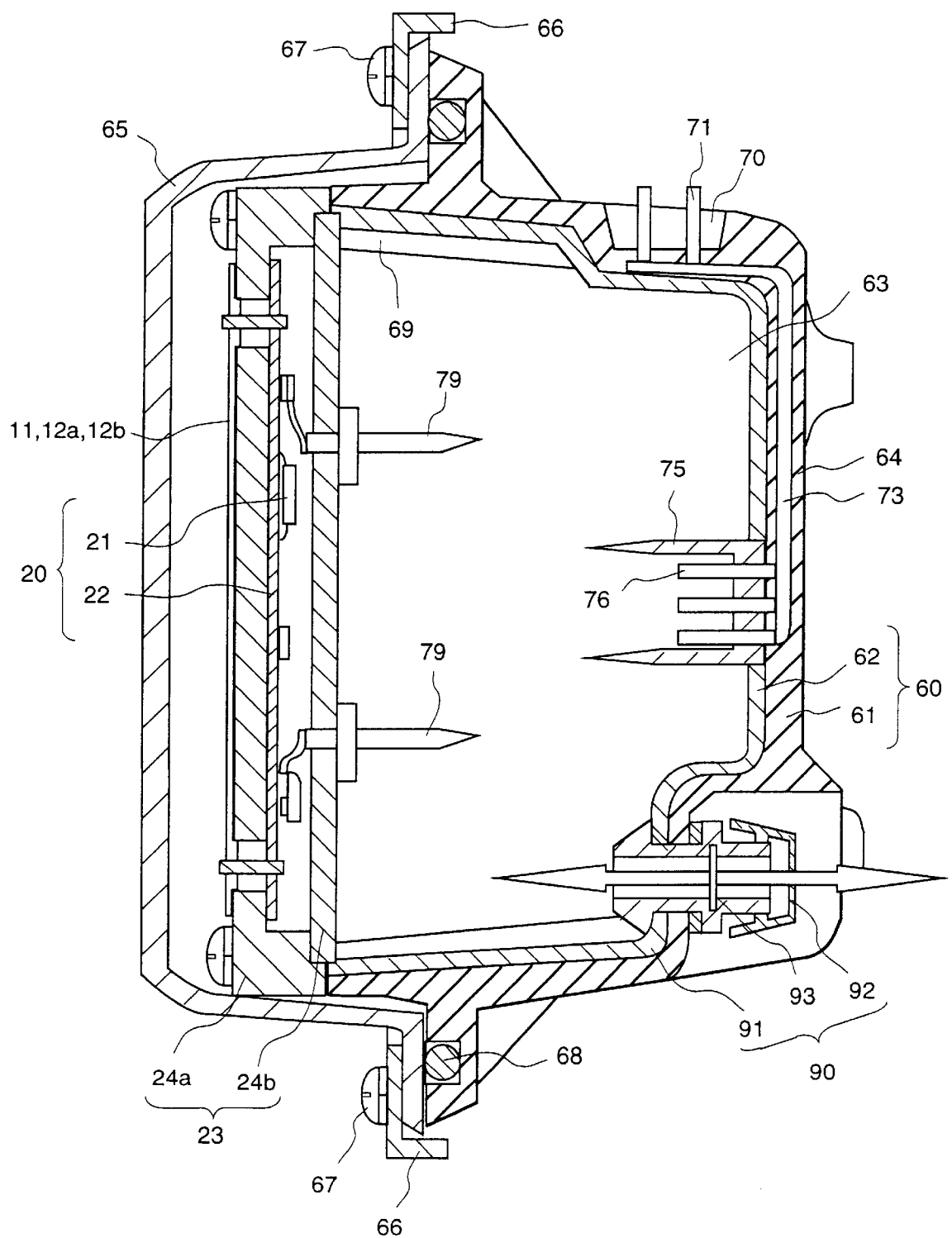
FIG. 7 is a cross-sectional view (internal circuit is omitted) of a vehicle-onboard radar system which is an embodiment according to the present invention.

A breathing valve 90, as shown in FIG. 7, comprises a valve main body 91 having a through-hole, a valve cover 92 having a plurality of micro vent holes thereon to prevent dust from entering the through-hole, and a waterproof breathing film 93 placed in the middle of the through-hole. The water-proof breathing film 93 has many vent holes which are smaller than a water molecule allowing air to pass through but not water. Therefore, there is no pressure difference between outside and inside the outer housing 60.

In the storage chamber 63 of the outer housing 60 mentioned above, as shown in FIGS. 2 to 4, an interface board 30, a signal processing circuit board 40, a power supply circuit board 50, and a board support base 80 which supports those boards 30, 40, and 50. Each board 30, 40, and 50 consists of a GND potential layer 32, 42, and 52 made of conductive material, two insulating layers 33a, 33b, 43a, 43b, 53a, and 53b which sandwich the GND potential layer 32, 42, and 52 from both sides, and various circuits formed on the insulating layers 33a, 33b, 43a, 43b, 53a, and 53b. The board support base 80 is made of conductive metal and comprises a supporting plate portion 81 disposed on the inner-periphery surface of the bottom wall 64 of the outer housing 60, a board connecting rod 82 and a board connecting rod 82 formed almost at four corners of the supporting plate portion 81, and a cylindrical shielding portion 83 formed almost at the center of the supporting plate portion 81. The center part of the supporting plate portion 81 is penetrated, and a cylindrical shielding portion 83 is formed along the inner edge of the through-hole. Each board 30, 40, and 50 is penetrated by board connecting rods 82, and a spacer 85 is placed among the boards.

Figure 5:
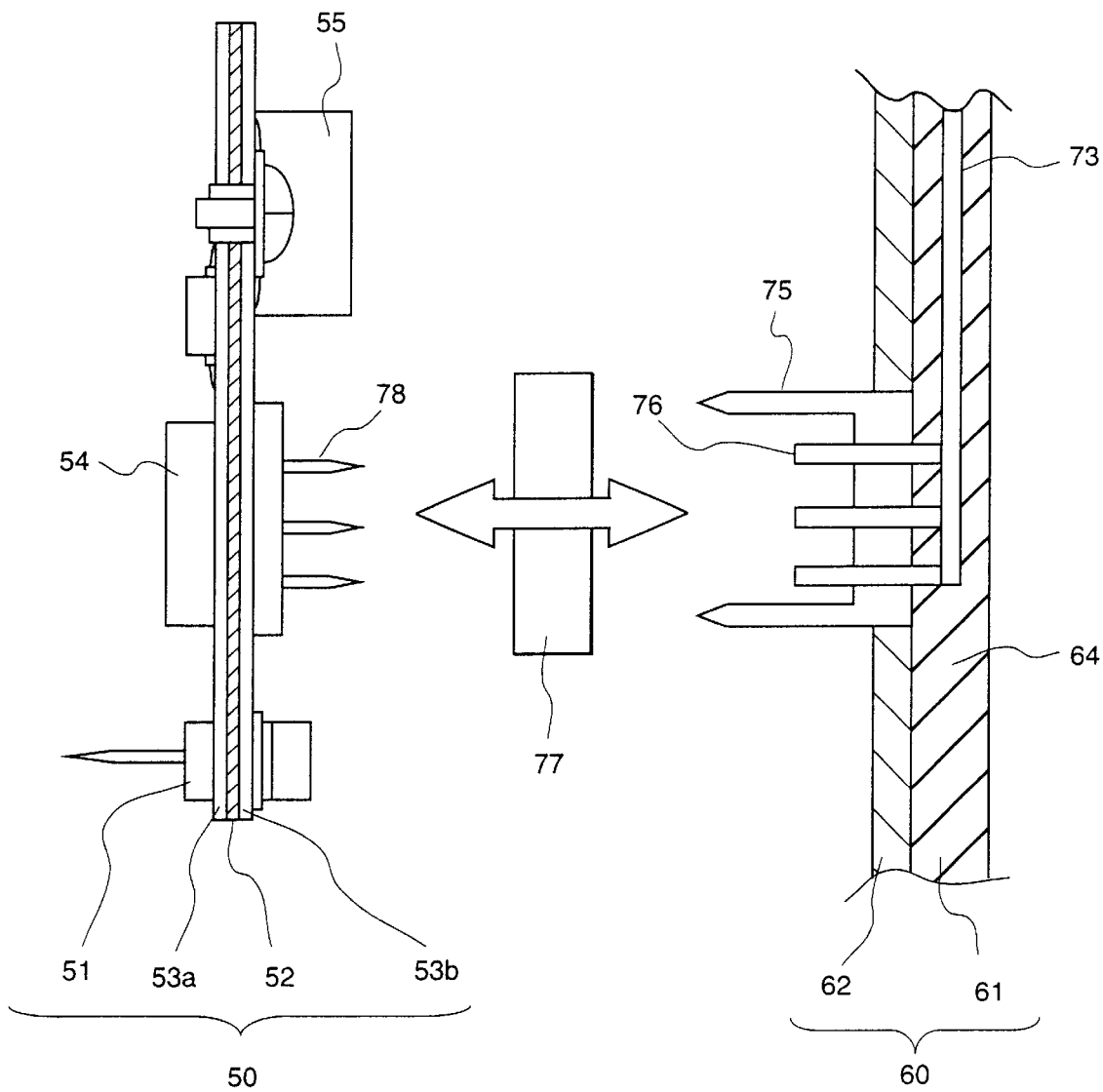
FIG. 5 is an explanatory drawing that shows the connection between the power supply circuit board and the transmission line in an embodiment according to the present invention.

The above-mentioned interface circuit 31 is formed on the insulating layers 33a and 33b of the interface board 30, the signal processing circuit 41 is formed on the insulating layers 43a and 43b of the signal processing circuit board 40, and a power supply circuit 51 and a filter circuit 54 are formed on the insulating layers 53a and 53b of the power supply circuit board 50 and an angular velocity sensor 55 is also placed thereon. As shown in FIG. 5, the filter circuit 54 is formed on the insulating layer 53a which is located at the far side of the bottom wall 64 of the outer housing 60 between two insulating layers 53a and 53b of the power supply circuit board 50. A transmission pin 78 extends from the filter circuit 54 and penetrates the insulating layer 53a, GND layer 52, and the other insulating layer 53b.

Figure 4:
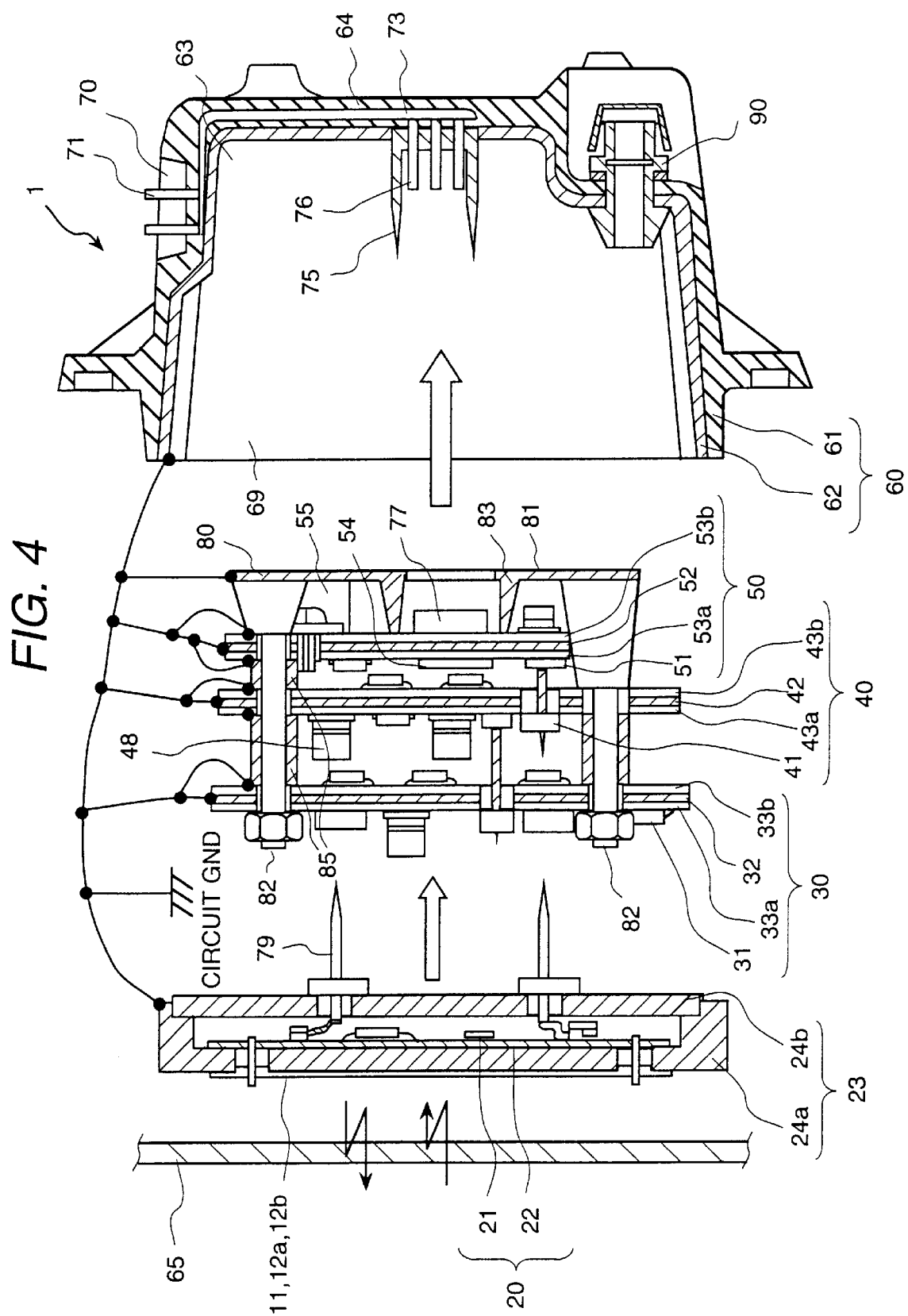
FIG. 4 is an explanatory drawing that shows connections among conductive materials in a vehicle-onboard radar system which is an embodiment according to the present invention.

The board support base 80 to which the power supply circuit board 50, the signal processing circuit board 40 and the interface board 30 are mounted is, as described above, contained inside the storage chamber 63 of the outer housing 60. In this process, as shown in FIGS. 4 and 5, the transmission pin 78 of the power supply circuit board 50 is connected to the connector pin 76 of the internal circuit connector 75 of the outer housing 60 via a relay connector 77. As a result, the connector pin 71 of the external connector 70 is connected to the transmission pin 78 of the power supply circuit board 50 via the transmission line 73, the connector pin 76 of the internal circuit connector 75 and the relay connector 77. Thus, in this embodiment, because a transmission pin 78 is mounted to the circuit board 50 as a connector and an internal circuit connector 75 is placed in the outer housing 60, when a circuit board 50 is contained inside the outer housing 60, the transmission line 73 is routed through the outer housing 60 can easily be electrically connected to the circuit board 50. Further, because the transmission pin 78 is placed in the circuit board 50 as a connector, without containing the circuit board 50 inside the outer housing 60, it is easy to conduct performance tests for each circuit including the circuit board 50.

Further, in this embodiment, the transmission line located between the shielding layer 62 of the outer housing 60 and the GND layer 52 of the power supply circuit board 50, i.e. the connector pin 76 of the internal circuit connector 75, the relay connector 77, and the tip-end portion of the transmission pin 78 of the power supply circuit board 50, are covered with the cylindrical shielding portion 83 of the board support base 80 on their outer-periphery side, and both end sides are covered with the shielding layer 62 of the outer housing 60 and the GND layer 52 of the power supply circuit board 50. Further, the transmission line 73 extending between the external connector 70 and the internal circuit connector 75 is, as described above, located on the outer-periphery side of the shielding layer 62 of the outer housing 60. That is, in this embodiment, the transmission line 73, 76, 77, and 78 which connects the external connector 70 and the power supply circuit board 50 is electromagnetically isolated from various circuits throughout the system by the shielding layer 62 of the outer housing 60 and the shielding portion 83 of the board support base 80. Furthermore, the transmission line 76, 77, and 78 extending from the internal circuit connector 75 to the power supply circuit board 50 is connected to the filter circuit 54 which is placed at a position immediately after the transmission line penetrates the GND layer 52 of the power supply circuit board 50. Therefore, even if electromagnetic noise is generated from the transmission line extending from the external connector 70 to the power supply circuit board 50, the electromagnetic noise is shielded by the conductor, such as the shielding layer 62 of the outer housing and the cylindrical shielding portion 83, and also because the filter circuit 54 is placed at a position immediately after the transmission line penetrates the GND layer 52 of the power supply circuit board 50, it is possible to suppress the effect of electromagnetic noise on various circuits 51, 41, and 31. Moreover, herein, because there is an insulating layer 53b between the GND layer 52 of the power supply circuit board 50 and the shielding portion 83, although a clearance is present between conductive material, this clearance, specifically equal to the thickness of the insulating layer 53b, is less than half of the wave length of the signal that runs through the transmission line; therefore, electromagnetic noise does not leak from this clearance. Furthermore, in this embodiment, the filter circuit 54 is placed at a position immediately after the transmission line penetrates the GND layer 52 of the power supply circuit board 50, however, it is also possible to place the filter circuit 54 at a position immediately before the transmission line penetrates the GND layer 52; the same result can be expected. Herein, the position immediately before or after the transmission line penetrates the GND layer 52 is a location which is closest to the GND layer 52 without any other processing circuit being present between the GND layer 52 and the filter circuit 54.

Further, in this embodiment, it is possible to provide the external connector 70 at an arbitrary position of the outer housing 60 by adjusting the length and route of the transmission line 73 which is routed along the outer-periphery side of the shielding layer 62 of the outer housing 60. Also, the transmission line 73 is routed through the outer housing main body 61 located on the outer-periphery side of the shielding layer 62. Accordingly, the size of the storage chamber 63 of the outer housing 60 is not reduced by the transmission line 73, thereby the storage chamber 63 of the outer housing 60 can be used efficiently.

As shown in FIG. 7, the opening 69 of the outer housing 60 is blocked by the antenna support base 23. This antenna support base 23 consists of a support base main body 24a where a storage chamber is formed and a cover 24b which blocks the opening of the support base main body 24a. Both the support base main body 24a and the cover 24b are made of conductive metal. A high-frequency circuit board 20 is placed in the storage chamber of the support base main body 24a. This high-frequency circuit board 20 comprises an insulating layer 22 and the above-mentioned high-frequency circuit 21a formed on the insulating layer 22. The high-frequency circuit 21 is electrically connected to other circuits, such as the interface circuit 30, power supply circuit 50, and the like, by a through-type connector pin 79 extending from the high-frequency circuit 21. Transmission and receiving antennas 11,12a and 12b are placed on the outer-periphery surface of the bottom wall equivalent portion of the storage chamber of the support base main body 24a. These transmission and receiving antennas 11,12a and 12b are covered with a radome 65. The radome 65 is mounted to the outer housing 60 by fixing plates 66 and screws 67 via O-rings 68. Moreover, the radome 65 is made of resin whose attenuation rate at the transmission of radio waves is significantly small. Furthermore, herein, although the entire antenna support base 23 is made of conductive metal, it is also possible, for example, to form insulating resin into a basic shape and cover the outer periphery with conductive metal, or the like.

Figure 6:
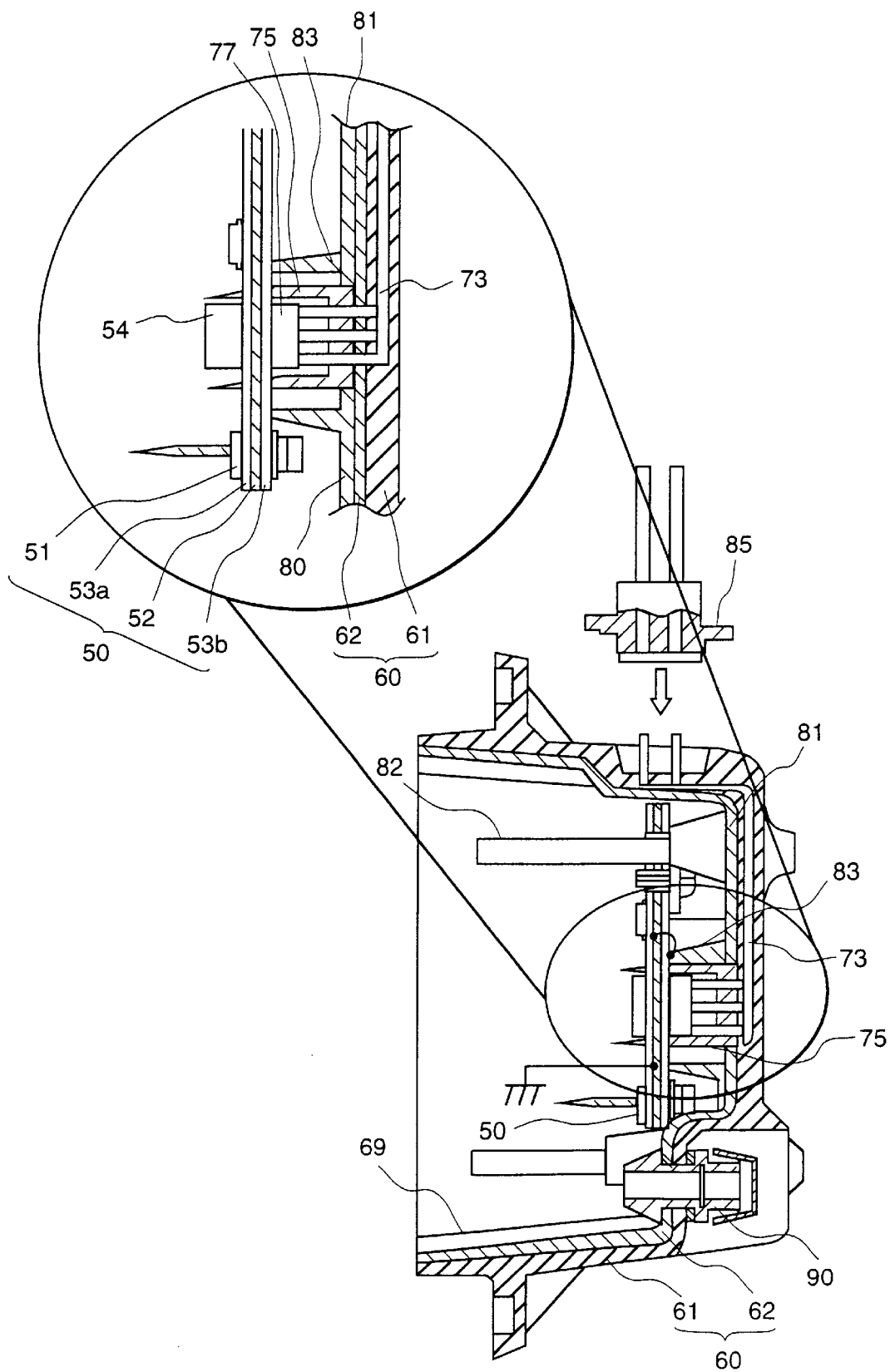
FIG. 6 is a cross-sectional view of the power supply circuit board and the board support base contained inside the outer housing in an embodiment according to the present invention.

As shown in FIG. 4, the conductive antenna support base 23, the GND layer 32 of the interface circuit board 30, the GND layer 42 of the signal processing circuit board 40, and the GND layer 52 of the power supply circuit board 50 are electrically connected to the shielding layer 62 of the conductive outer housing 60. Specifically, as shown in FIG. 7, the antenna support base 23 directly comes in contact with the edge portion of the shielding layer 62 at the opening 69 of the outer housing 60 to be electrically connected to the shielding layer 62. Further, as shown in FIGS. 4 and 6, the GND layer 32 of the interface circuit board 30, the GND layer 42 of the signal processing circuit board 40, and the GND layer 52 of the power supply circuit board 50 come in contact with the board connecting rod 82 of the board support base 80 and are electrically connected to the shielding layer 62 as the result of the supporting plate portion 81 of the board support base 80 where the board connecting rod 82 is formed coming contact with the shielding layer 62 of the outer housing 60. Accordingly, the GND layers 32, 42, and 52 of respective circuit boards 30, 40, and 50 have the same potential (GND potential).

The transmission antenna 11 which transmits high-frequency radio waves and the receiving antennas 12a and 12b which receive high-frequency radio waves are electromagnetically blocked from other circuits 21, 31, 41, and 51 by the conductive antenna support base 23, thereby the magnetic effect of these antennas on each circuit can be avoided. Further, as described above, the high-frequency circuit 21 is covered with the conductive antenna support base 23; a circuit between the GND layer 32 of the interface circuit board 30 and the antenna support base 23 is covered with the GND layer 32 of the interface circuit board 30, an antenna support base 23, and the shielding layer 62 of the outer housing 60; a circuit between the GND layer 32 of the interface circuit board 30 and the GND layer 42 of the signal processing circuit board 40 is covered with the GND layer 32 of the interface circuit board 30, the GND layer 42 of the signal processing circuit board 40 and the shielding layer 62 of the outer housing 60; and a circuit between the GND layer 42 of the signal processing circuit board 40 and the GND layer 52 of the power supply circuit board 50 is covered with the GND layer 42 of the signal processing circuit board 40, the GND layer 52 of the power supply circuit board 50 and the shielding layer 62 of the outer housing 60. Consequently, it is possible to efficiently and effectively suppress the magnetic effect on the circuits.

Moreover, in the above-mentioned embodiment, a transmission line includes a signal line and a power supply line and is magnetically shielded; however, the present invention is not limited to this structure and only a signal line, or only a power supply line can be magnetically shielded in the same manner as this embodiment.

Furthermore, the above-mentioned embodiment shows an example where an external connection portion is an external connector; however, in cases where an external connection cable is directly mounted to the outer housing as an external connection portion instead of the external connector, it is possible to magnetically shield the transmission line extending from the cable in the same manner as this embodiment is shielded.

Moreover, the above-mentioned embodiment shows an example where the present invention is applied to a vehicle-onboard radar system; however, the present invention is not limited to this example and can be applicable to any vehicle-onboard device which handles a transmission target, such as a signal or electric power; for example, an automobile navigation system, ETC (Electronic Toll Collection) device, or the like.

According to the present invention of this application, a signal line extending from the external connection portion to the internal circuit is routed to the desired position along the outer-periphery side of the shielding layer of the outer housing, thereby the external connection portion can be placed at any location without being limited by the position of the internal circuit.

Further, according to another invention of this application, a transmission line extending from the shielding layer of the outer housing to the internal circuit is covered with the conductive layer of the board where the internal circuit is provided, the shielding layer of the outer housing, and the shielding portion of the board support base; and in addition, a noise removal means is placed immediately before or after the conductive layer of the board. Accordingly, even if noise is present in the transmission line, it is possible to efficiently suppress the effect of the noise on various circuits including the internal circuit.

What is claimed is:

1. A vehicle-onboard signal processing device mounted on a vehicle so as to receive electric power and transmit and receive a signal between the vehicle and the outside, comprising:
   an internal circuit where said signal is input and output,
   an outer housing which covers said internal circuit and a conductive shielding layer applied to an inner-periphery side of said outer housing,
   an external connection portion mounted to said outer housing and facing the outside of said outer housing so as to transmit and receive said signal with said outside, and
   a transmission line which electrically connects said internal circuit to said external connection portion, wherein
   said transmission line extends from said external connection portion as a base point, goes between an outer-periphery surface of said outer housing and said shielding layer, extends along a direction of an inner-periphery surface of the outer housing, penetrates the shielding layer, and then connects to said internal circuit.

2. A vehicle-onboard signal processing device according to claim 1, further comprising:
   an internal circuit board having said internal circuit, and
   a board support base placed inside said outer housing so as to support said internal circuit board, wherein
   said board support base has a cylindrical shielding portion made of conductive material which covers the outer periphery of the transmission line between the position at which said transmission line penetrates said shielding layer and said internal circuit board,
   said internal circuit board comes in contact with said cylindrical shielding portion to close an opening at an end portion of said cylindrical shielding portion,
   said internal circuit board has a conductive layer and a noise removal means for removing noise coming through said transmission line, and
   the noise removal means is placed immediately before or after a position at which said transmission line extending from said shielding layer penetrates said conductive layer.

3. A vehicle-onboard signal processing device mounted on a vehicle so as to receive electric power and transmit and receive a signal between the vehicle and the outside, comprising:
   an internal circuit board having an internal circuit where said signal is input and output,
   a board support base which supports said internal circuit board,
   an outer housing which covers said internal circuit board and said board support base and a conductive shielding layer applied to an inner-periphery side of said outer housing, and
   a transmission line which penetrates said shielding layer from an outer-periphery side to the inner-periphery side and is electrically connected to said internal circuit so as to transmit and receive said signal with said outside, wherein
   said board support base has a cylindrical shielding portion made of conductive material which covers the outer periphery of the transmission line between a position at which said transmission line penetrates said shielding layer and said internal circuit board,
   said internal circuit board comes in contact with said cylindrical shielding portion to close an opening at an end portion of said cylindrical shielding portion,
   said internal circuit board has a conductive layer and a noise removal means for removing noise coming through said transmission line, and
   the noise removal means is placed immediately before or after a position at which said transmission line extending from said shielding layer penetrates said conductive layer.

4. A vehicle-onboard signal processing device according to claim 2 or claim 3, wherein
   said conductive layer of said internal circuit board forms a ground layer of said internal circuit and is electrically connected to said shielding layer of said outer housing.

5. A vehicle-onboard signal processing device according to claim 2 or claim 3, wherein
   said conductive layer of said internal circuit board comes in contact with said shielding portion of said board support base without a clearance, or, even if there is a clearance, the length of the clearance is less than half of a wave length of the signal to be used.

6. A vehicle-onboard signal processing device according to claim 2 or claim 3, wherein
   at least one connector to connect the transmission line is provided inside said cylindrical shielding portion.

7. A vehicle-onboard signal processing device according to claim 2 or claim 3, wherein
   said outer housing has a penetrated portion which is penetrated from the outer-periphery side to the inner-periphery side of said outer housing, and
   said penetrated portion has a breathing valve comprising:
     a dust preventing means which has many pores of the proper size to prevent dust from entering, and
     a water preventing means which has many small pores of the proper size to prevent water molecules from entering.

8. A vehicle-onboard radar system comprising:
   a vehicle-onboard signal processing device according to claim 2 or claim 3,
   a transmission antenna which transmits radio waves,
   a receiving antenna which receives radio waves,
   a high-frequency circuit which transmits transmission signals to said transmission antenna and receives received signals from said receiving antennas,
   a high-frequency related circuit board having a high-frequency related circuit which transmits and/or receives signal or electric power with said high-frequency circuit, and
   an antenna support base which covers said high-frequency circuit, mounts said transmission antenna and said receiving antenna on the outer-periphery surface, and is made of conductive material so as to electromagnetically shield said high-frequency related circuit board, the high-frequency circuit, the transmission antenna and the receiving antenna, respectively.

9. A vehicle-onboard radar system according to claim 8, wherein said high-frequency related circuit board comprises a circuit board as said internal circuit board and another circuit board, said another circuit board has a conductive layer as a ground layer, a circuit located between the conductive layer of said internal circuit board and the conductive layer of said another circuit board is covered with the conductive layer of the internal circuit board, the conductive layer of another circuit and said shielding layer of said outer housing, a circuit located between the conductive layer of said another circuit board and said antenna support base is covered with the conductive layer of another circuit board, the antenna support base and said shielding layer of said outer housing, and said conductivity material of said antenna support base, the conductive layer of said another circuit board and the conductive layer of said internal circuit board are electrically connected.

10. A vehicle-onboard signal processing device according to claim 4, wherein said conductive layer of said internal circuit board comes in contact with said shielding portion of said board support base without a clearance, or, even if there is a clearance, the length of the clearance is less than half of a wave length of the signal to be used.

11. A vehicle-onboard signal processing device according to claim 4, wherein at least one connector to connect the transmission line is provided inside said cylindrical shielding portion.

12. A vehicle-onboard signal processing device according to claim 5, wherein at least one connector to connect the transmission line is provided inside said cylindrical shielding portion.

13. A vehicle-onboard signal processing device according to claim 4, wherein said outer housing has a penetrated portion which is penetrated from the outer-periphery side to the inner-periphery side of said outer housing, and said penetrated portion has a breathing valve comprising:
a dust preventing means which has many pores of the proper size to prevent dust from entering, and
a water preventing means which has many small pores of the proper size to prevent water molecules from entering.

14. A vehicle-onboard signal processing device according to claim 5, wherein said outer housing has a penetrated portion which is penetrated from the outer-periphery side to the inner-periphery side of said outer housing, and said penetrated portion has a breathing valve comprising:
a dust preventing means which has many pores of the proper size to prevent dust from entering, and
a water preventing means which has many small pores of the proper size to prevent water molecules from entering.

15. A vehicle-onboard signal processing device according to claim 6, wherein said outer housing has a penetrated portion which is penetrated from the outer-periphery side to the inner-periphery side of said outer housing, and said penetrated portion has a breathing valve comprising:
a dust preventing means which has many pores of the proper size to prevent dust from entering, and
a water preventing means which has many small pores of the proper size to prevent water molecules from entering.

16. A vehicle-onboard radar system comprising:

a vehicle-onboard signal processing device according to claim 4, a transmission antenna which transmits radio waves, a receiving antenna which receives radio waves, a high-frequency circuit which transmits transmission signals to said transmission antenna and receives received signals from said receiving antennas, a high-frequency related circuit board having a high-frequency related circuit which transmits and/or receives signal or electric power with said high-frequency circuit, and an antenna support base which covers said high-frequency circuit, mounts said transmission antenna and said receiving antenna on the outer-periphery surface, and is made of conductive material so as to electromagnetically shield said high-frequency related circuit board, the high-frequency circuit, the transmission antenna and the receiving antenna, respectively.

17. A vehicle-onboard radar system comprising:

a vehicle-onboard signal processing device according to claim 5, a transmission antenna which transmits radio waves, a receiving antenna which receives radio waves, a high-frequency circuit which transmits transmission signals to said transmission antenna and receives received signals from said receiving antennas, a high-frequency related circuit board having a high-frequency related circuit which transmits and/or receives signal or electric power with said high-frequency circuit, and an antenna support base which covers said high-frequency circuit, mounts said transmission antenna and said receiving antenna on the outer-periphery surface, and is made of conductive material so as to electromagnetically shield said high-frequency related circuit board, the high-frequency circuit, the transmission antenna and the receiving antenna, respectively.

18. A vehicle-onboard radar system comprising:

a vehicle-onboard signal processing device according to claim 6, a transmission antenna which transmits radio waves, a receiving antenna which receives radio waves, a high-frequency circuit which transmits transmission signals to said transmission antenna and receives received signals from said receiving antennas, a high-frequency related circuit board having a high-frequency related circuit which transmits and/or receives signal or electric power with said high-frequency circuit, and an antenna support base which covers said high-frequency circuit, mounts said transmission antenna and said receiving antenna on the outer-periphery surface, and is made of conductive material so as to electromagnetically shield said high-frequency related circuit board, the high-frequency circuit, the transmission antenna and the receiving antenna, respectively.

19. A vehicle-onboard radar system comprising:

a vehicle-onboard signal processing device according to claim 7, a transmission antenna which transmits radio waves, a receiving antenna which receives radio waves, a high-frequency circuit which transmits transmission signals to said transmission antenna and receives received signals from said receiving antennas, a high-frequency related circuit board having a high-frequency related circuit which transmits and/or receives signal or electric power with said high-frequency circuit, and an antenna support base which covers said high-frequency circuit, mounts said transmission antenna and said receiving antenna on the outer-periphery surface, and is made of conductive material so as to electromagnetically shield said high-frequency related circuit board, the high-frequency circuit, the transmission antenna and the receiving antenna, respectively.

20. A vehicle-onboard radar system according to claim 16, wherein said high-frequency related circuit board comprises a circuit board as said internal circuit board and another circuit board, said another circuit board has a conductive layer as a ground layer, a circuit located between the conductive layer of said internal circuit board and the conductive layer of said another circuit board is covered with the conductive layer of the internal circuit board, the conductive layer of another circuit and said shielding layer of said outer housing, a circuit located between the conductive layer of said another circuit board and said antenna support base is covered with the conductive layer of another circuit board, the antenna support base and said shielding layer of said outer housing, and said conductivity material of said antenna support base, the conductive layer of said another circuit board and the conductive layer of said internal circuit board are electrically connected.

21. A vehicle-onboard radar system according to claim 17, wherein said high-frequency related circuit board comprises a circuit board as said internal circuit board and another circuit board, said another circuit board has a conductive layer as a ground layer, a circuit located between the conductive layer of said internal circuit board and the conductive layer of said another circuit board is covered with the conductive layer of the internal circuit board, the conductive layer of another circuit and said shielding layer of said outer housing, a circuit located between the conductive layer of said another circuit board and said antenna support base is covered with the conductive layer of another circuit board, the antenna support base and said shielding layer of said outer housing, and said conductivity material of said antenna support base, the conductive layer of said another circuit board and the conductive layer of said internal circuit board are electrically connected.

22. A vehicle-onboard radar system according to claim 18, wherein said high-frequency related circuit board comprises a circuit board as said internal circuit board and another circuit board, said another circuit board has a conductive layer as a ground layer, a circuit located between the conductive layer of said internal circuit board and the conductive layer of said another circuit board is covered with the conductive layer of the internal circuit board, the conductive layer of another circuit and said shielding layer of said outer housing, a circuit located between the conductive layer of said another circuit board and said antenna support base is covered with the conductive layer of another circuit board, the antenna support base and said shielding layer of said outer housing, and said conductivity material of said antenna support base, the conductive layer of said another circuit board and the conductive layer of said internal circuit board are electrically connected.

23. A vehicle-onboard radar system according to claim 19, wherein said high-frequency related circuit board comprises a circuit board as said internal circuit board and another circuit board, said another circuit board has a conductive layer as a ground layer, a circuit located between the conductive layer of said internal circuit board and the conductive layer of said another circuit board is covered with the conductive layer of the internal circuit board, the conductive layer of another circuit and said shielding layer of said outer housing, a circuit located between the conductive layer of said another circuit board and said antenna support base is covered with the conductive layer of another circuit board, the antenna support base and said shielding layer of said outer housing, and said conductivity material of said antenna support base, the conductive layer of said another circuit board and the conductive layer of said internal circuit board are electrically connected.

* * * * *